US007641172B2

(12) United States Patent
Richards et al.

(10) Patent No.: US 7,641,172 B2
(45) Date of Patent: Jan. 5, 2010

(54) ACTUATOR INSTALLATION BRACKET, AND VALVE ACTUATOR ASSEMBLY AND FLUID SHUTOFF SYSTEM EMPLOYING THE SAME

(75) Inventors: David L. Richards, Draper, UT (US); Michael R. Mammone, New Brighton, PA (US)

(73) Assignee: Eaton Corporation, Cleveland, OH (US)

( * ) Notice: Subject to any disclaimer, the term of this patent is extended or adjusted under 35 U.S.C. 154(b) by 539 days.

(21) Appl. No.: 11/536,707

(22) Filed: Sep. 29, 2006

(65) Prior Publication Data

US 2008/0078973 A1 Apr. 3, 2008

(51) Int. Cl.
*F16K 51/00* (2006.01)

(52) U.S. Cl. .............................. 251/129.04; 251/129.11; 251/292

(58) Field of Classification Search ............ 251/315.01, 251/292, 129.11, 129.12, 129.13, 129.04
See application file for complete search history.

(56) References Cited

U.S. PATENT DOCUMENTS

| 3,430,916 | A | * | 3/1969 | Raymond, Jr. ......... 251/129.12 |
| 4,260,128 | A | | 4/1981 | Tito |
| 4,633,897 | A | * | 1/1987 | Effenberger ................ 251/292 |
| 4,719,939 | A | * | 1/1988 | Killian ....................... 251/292 |
| 4,727,899 | A | | 3/1988 | Massey et al. |
| 5,131,623 | A | * | 7/1992 | Giordani ................ 251/129.11 |
| 5,540,414 | A | * | 7/1996 | Giordani et al. ............. 251/171 |
| 5,634,486 | A | * | 6/1997 | Hatting et al. ............... 251/292 |
| 6,491,062 | B1 | * | 12/2002 | Croft ..................... 251/129.04 |
| 6,742,765 | B2 | * | 6/2004 | Takano et al. ................ 251/292 |
| 2003/0066981 | A1 | * | 4/2003 | Cross et al. .................. 251/292 |
| 2003/0226590 | A1 | * | 12/2003 | Szafron ........................ 137/382 |
| 2006/0125632 | A1 | | 6/2006 | Luebke et al. |

FOREIGN PATENT DOCUMENTS

FR 2 463 349 2/1981

OTHER PUBLICATIONS

DynaQuip Controls, "DynaQuip—Actuator and Automated Valve Innovations", 2006, 3 pp.

\* cited by examiner

*Primary Examiner*—John Bastianelli
(74) *Attorney, Agent, or Firm*—Martin J. Moran

(57) ABSTRACT

An actuator installation bracket is provided for a water shutoff system including a water line, a shutoff valve having a stem, and an actuator. The actuator includes a housing having first and second ends, sides, and a pivotable actuating member. The actuator installation bracket includes a first mounting portion having first and second ends and a base portion extending therebetween. The base portion includes a number of apertures and receives the actuator. A second mounting portion extends outwardly from the base portion and is coupled to one of the water line and the shutoff valve, in order that the pivotable actuating member of the actuator is aligned with a corresponding one of the apertures of the base portion and with the stem of the shutoff valve. A key couples the pivotable actuating member to the shutoff valve stem to open and close the shutoff valve.

6 Claims, 5 Drawing Sheets

ACTUATOR INSTALLATION BRACKET, AND VALVE ACTUATOR ASSEMBLY AND FLUID SHUTOFF SYSTEM EMPLOYING THE SAME

BACKGROUND OF THE INVENTION

1. Field of the Invention

The invention relates generally to actuators and, more particularly, to an installation bracket for mounting an actuator at or about the shutoff valve for a fluid shutoff system. The invention also relates to valve actuator assemblies for fluid shutoff systems. The invention further relates to fluid shutoff systems, such as water shutoff systems.

2. Background Information

Water is typically supplied to structures, such as residential homes and commercial buildings, for example, through a water line which supplies water to the structure from an outside source, such as a public water authority or a well. A shut off valve such as, for example, a ball valve, is employed at the location where the water supply line is connected to the main or primary water line of the structure. Secondary water lines extend from the main water line of the structure and throughout the structure for supplying water to apparatus such as, for example, hot water heaters, sinks, toilets, bathtubs, showers, and other apparatus which use water. It will be appreciated that other fluids, such as, for example and without limitation, natural gas, can be similarly supplied to and routed throughout the structure.

Automated water shutoff systems are sometimes employed, for example, as a safety device, to cut-off the flow of water being supplied to the structure in the event of a leak or flooding condition. For example, the shutoff valve may be automated as part of an automated awareness system capable of sensing such a condition, and automatically closing the shutoff valve accordingly. Such systems employ a number of sensors throughout the structure to monitor and detect abnormal conditions and, in some instances, to perform a function in response to the condition which is detected. Specifically, the shutoff valve serves to shut off flow through the water supply line when the valve is closed, and to permit water to be supplied to the structure when the valve is open. This function (i.e., opening and closing of the valve) may be automated as part of the automated awareness system. For example, sensors could be employed in a low-lying area of the structure (e.g., without limitation, the basement; at the base of a water heater; at the base of a sink or toilet) to detect a leak or flooding condition. This information can then be electronically transmitted or forwarded to an actuator of the water shutoff valve to automatically close the valve.

Traditionally, in order to provide such an automated water shutoff function, a custom shutoff valve has been required which employs an actuator, including a motor and a power supply for opening and closing the valve. For example and without limitation, a DYNAMATIC™ valve, which is a customized automated valve, has been known to be employed to automate the water shutoff function. DYNAMATIC™ valves are available from DynaQuip Controls, which has a place of business at 10 Harris Industrial Park, St. Clair, Mo. 63077. Custom valve systems can be quite expensive. Additionally, retrofitting an existing water shutoff valve has typically necessitated the hiring of a skilled plumber to remove the existing ball valve and replace it with the custom valve. It would, therefore, be desirable to provide a water shutoff system wherein the components (e.g., without limitation, actuator) of the system can be relatively easily installed as a retrofit to engage and actuate the existing ball valve, shutoff valve, as opposed to having to replace it with a relatively high cost customized unit.

There is, therefore, room for improvement in water shutoff systems, and in valve actuator assemblies therefor.

SUMMARY OF THE INVENTION

These needs and others are met by embodiments of the invention, which are directed to an installation bracket and valve actuator assembly for an automated fluid shutoff system, such as a water shutoff system, that allows an actuator to be retrofit for use with the existing water shutoff valve.

As one aspect of the invention, an actuator installation bracket is provided for a fluid shutoff system. The fluid shutoff system includes a fluid line for supplying fluid, a shutoff valve coupled to the fluid line and including a stem, and an actuator. The actuator includes a housing having a first end, a second end, a plurality of sides, and a pivotable actuating member. The pivotable actuating member protrudes from one of the sides of the housing. The actuator installation bracket comprises: a first mounting portion including first and second ends and a base portion extending therebetween, such base portion including a number of apertures and being structured to receive such side of the housing which has the pivotable actuating member protruding therefrom; and a second mounting portion extending outwardly from the base portion of the first mounting portion and being structured to be coupled to one of the fluid line and the shutoff valve. The actuator is structured to be secured to the first mounting portion of the actuator installation bracket and the actuator installation bracket is structured to be secured to such one of the fluid line and the shutoff valve by the second mounting portion of the actuator installation bracket, in order that the pivotable actuating member of the actuator is aligned with a corresponding one of the apertures of the base portion of the first mounting portion and with the stem of the shutoff valve. The pivotable actuating member of the actuator is structured to be coupled to the stem of the shutoff valve in order to pivot the stem and operate the shutoff valve between an open position corresponding to fluid being free to flow through the shutoff valve, and a closed position corresponding to fluid being prohibited from flowing through the shutoff valve.

The first and second ends of the first mounting portion may extend outwardly from the base portion to engage the first end of the housing of the actuator and the second end of the housing of the actuator, respectively. The sides of the housing of the actuator may include a base, a top, and first and second sides, and the first end of the first and second ends of the first mounting portion may further comprise first and second opposing ears extending outwardly generally perpendicularly from the first end, wherein the first and second opposing ears are structured to engage the first and second sides of the housing of the actuator, respectively.

The second mounting portion may comprise a generally U-shaped portion including a first side flange and a second side flange disposed opposite and distal from the first side flange, wherein the first side flange and the second side flange are structured to receive one of the fluid line and the shutoff valve therebetween. The actuator installation bracket may include a vertical axis, and the generally U-shaped portion and the first side flange and the second side flange thereof may extend outwardly from the base portion of the first mounting portion in the opposite direction of the first and second ends of the first mounting portion. The generally U-shaped portion of the second mounting portion and the first and second ends of the first mounting portion may be rotated about the vertical axis of the actuator installation bracket about 90 degrees with respect to one another.

As another aspect of the invention, a valve actuator assembly is provided for a fluid shutoff system including a fluid line for supplying fluid and a shutoff valve coupled to the fluid line. The shutoff valve includes a stem. The valve actuator assembly comprises: an actuator including a housing having a first end, a second end, a base, a top, first and second sides, and a pivotable actuating member, the pivotable actuating member protruding from the base of the housing; a key including a first end coupled to the pivotable actuating member of the actuator, and a second end structured to be coupled to the stem of the shutoff valve; an actuator installation bracket comprising: a first mounting portion including a base portion and first and second ends extending outwardly from the base portion in order to engage the first end of the housing of the actuator and the second end of the housing of the actuator, respectively, the base portion receiving the base of the housing of the actuator, and including a number of apertures, and a second mounting portion extending outwardly from the base portion of the first mounting portion and being structured to be coupled to one of the fluid line and the shutoff valve; and a fastening mechanism fastening the second mounting portion of the actuator installation bracket to such one of the fluid line and the shutoff valve, in order to align the pivotable actuating member of the actuator with a corresponding one of the apertures of the base portion of the first mounting portion and the stem of the shutoff valve, and the key. The actuator is structured to pivot the stem of the shutoff valve, thereby operating the shutoff valve between an open position corresponding to fluid being free to flow through the shutoff valve, and a closed position corresponding to fluid being prohibited from flowing through the shutoff valve.

As a further aspect of the invention, a fluid shutoff system comprises: a fluid line for supplying fluid; a shutoff valve coupled to the fluid line, the shutoff valve including a stem; a valve actuator assembly comprising: an actuator including a transceiver, a housing, and a pivotable actuating member, the housing enclosing the transceiver and including a first end, a second end, a base, a top, and first and second sides, the pivotable actuating member protruding from the base of the housing; a key including a first end coupled to the pivotable actuating member of the actuator, and a second end coupled to the stem of the shutoff valve; an actuator installation bracket comprising: a first mounting portion including a base portion and first and second ends extending outwardly from the base portion in order to engage the first end of the housing of the actuator and the second end of the housing of the actuator, respectively, the base portion receiving the base of the housing of the actuator, the base portion including a number of apertures, and a second mounting portion extending outwardly from the base portion of the first mounting portion and being coupled to one of the fluid line and the shutoff valve, a fastening mechanism securing the second mounting portion of the actuator installation bracket to such one of the fluid line and the shutoff valve, in order to align the pivotable actuating member of the actuator with a corresponding one of the apertures of the base portion of the first mounting portion and the stem of the shutoff valve, and the key coupled between the pivotable actuating member and the stem, a number of nodes in electrical communication with the transceiver of the actuator; and a power supply providing electrical power to the actuator. The actuator is coupled to the stem of the shutoff valve by the key, in order to move the stem, thereby operating the shutoff valve between an open position corresponding to fluid being free to flow through the shutoff valve, and a closed position corresponding to fluid being prohibited from flowing through the shutoff valve. The transceiver of the actuator is structured to receive a message from one of the nodes and responsively pivot the pivotable actuating member of the actuator.

The stem of the shutoff valve may include at least one substantially flat portion, and the pivotable actuating member of the actuator may comprise a pivotable protrusion having at least one flat portion. The first end of the key may comprise a first recess including at least one flat portion receiving and engaging the flat portion of the pivotable protrusion of the actuator, and the second end of the key comprises a second recess including at least one flat portion receiving and engaging the flat portion of the stem of the shutoff valve, in order that movement of the pivotable protrusion of the actuator is transmitted through the key to move the stem of the shutoff valve.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
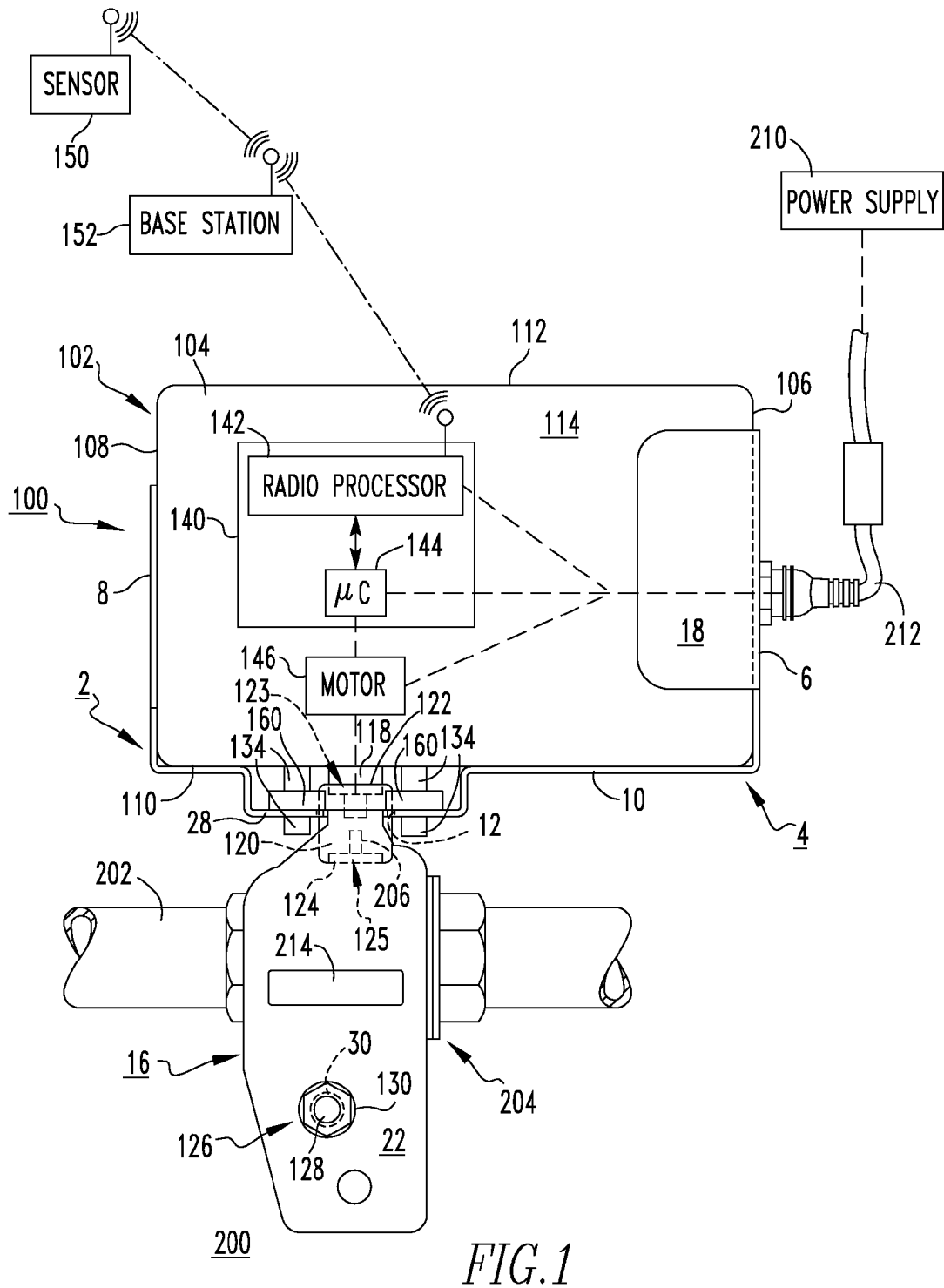
FIG. 1 is a side elevation view of a water shutoff system, and valve actuator assembly and actuator installation bracket therefor, and a ball valve, in accordance with an embodiment of the invention, with components of the actuator and the sensor and power supply therefor shown in simplified form.

For purposes of illustration, embodiments of the invention will be described as applied to an actuator installation bracket for an automated water shutoff system wherein the bracket is coupled to a water shutoff valve (e.g., without limitation, a ball valve), although it will become apparent that they could be applied to attach the actuator installation bracket at or about any known or suitable alternative type of valve (e.g., without limitation, a gate valve), and in systems other than water shutoff systems such as, for example and without limitation, with valves for controlling the flow of fluids (e.g., without limitation, natural gas) other than water.

Directional phrases used herein, such as, for example, left, right, front, back, top, bottom and derivatives thereof, relate to the orientation of the elements shown in the drawings and are not limiting upon the claims unless expressly recited therein.

As employed herein, the term "transceiver" refers to any known or suitable electronic mechanism for receiving and/or transmitting signals to and/or from another transceiver, and expressly includes, without limitation, a wireless transceiver for wireless communications.

As employed herein, the term "network coordinator" (NC) shall expressly include, but not be limited by, any communicating device, which operates as the coordinator for devices wanting to join a communication network and/or as a central controller in a wireless communication network.

As employed herein, the term "network device" (ND) shall expressly include, but not be limited by, any communicating device (e.g., a portable wireless communicating device; a fob; a camera/sensor device; a wireless camera; a control device; and/or a fixed wireless communicating device, such as, for example, switch sensors, motion sensors, temperature sensors, or any other suitable type of sensor as employed in a wirelessly enabled sensor network), which participates in a wireless communication network, and which is not a network coordinator.

As employed herein, the term "node" includes NDs and NCs.

As employed herein, the term "wireless" shall expressly include, but not be limited by, radio frequency (RF), infrared, IrDA, wireless area networks, IEEE 802.11 (e.g., 802.11a; 802.11b; 802.11g), IEEE 802.15 (e.g., 802.15.1; 802.15.3, 802.15.4), other wireless communication standards (e.g., without limitation, ZigBee™ Alliance standard), DECT, PWT, pager, PCS, Wi-Fi, Bluetooth™, and cellular.

As employed herein the term "sensor" refers to any known or suitable apparatus structured to sense a condition and, in response, to provide a number of signals to an electronic device, such as a transceiver. Non-limiting examples of sensors include water or moisture detection sensors for sensing undesirable amounts of moisture or liquid, such as a flood or drought condition. Other non-limiting examples of sensors include water leaks; power outages; abnormal temperatures (e.g., home; refrigerator; furnace; air conditioner; heat pump); motion (e.g., child; pet; elderly person; wild animal); alarm (e.g., open or ajar; door; window; cabinet); appliance on (e.g., iron; television; coffee pot); sound (e.g., smoke alarm; intruder alert); status of detached garage; tremor (e.g., earthquake); odor (e.g., natural gas); pressure (e.g., package delivered to front door mat); manual request (e.g., a button is pressed on a "nameable" sensor, such as, for example, "bring takeout" or "out of milk"). Further non-limiting examples of sensors include, for example, conventional security devices (e.g., motion; door status; window status; smoke; fire; heat; gas (e.g., carbon monoxide, natural gas); alarm) and home condition monitors (e.g., moisture; temperature; power; energy (e.g., natural gas; water; electricity; power)).

As employed herein, the term "power supply" shall include any known or suitable mechanism for providing electrical power and expressly includes, without limitation, batteries, other direct current (DC) power sources, alternating current (AC) power sources, and AC/DC power sources.

As employed herein, the term "fastener" refers to any suitable connecting or tightening mechanism expressly including, but not limited to, screws, bolts and the combinations of bolts and nuts (e.g., without limitation, jock nuts) and bolts, washers (e.g., without limitation lock washers) and nuts.

As employed herein, the statement that two or more parts are "coupled" together shall mean that the parts are joined together either directly or joined through one or more intermediate parts.

As employed herein, the term "number" shall refer to the quantity one and to an integer greater than one (i.e., a plurality).

Figure 2:
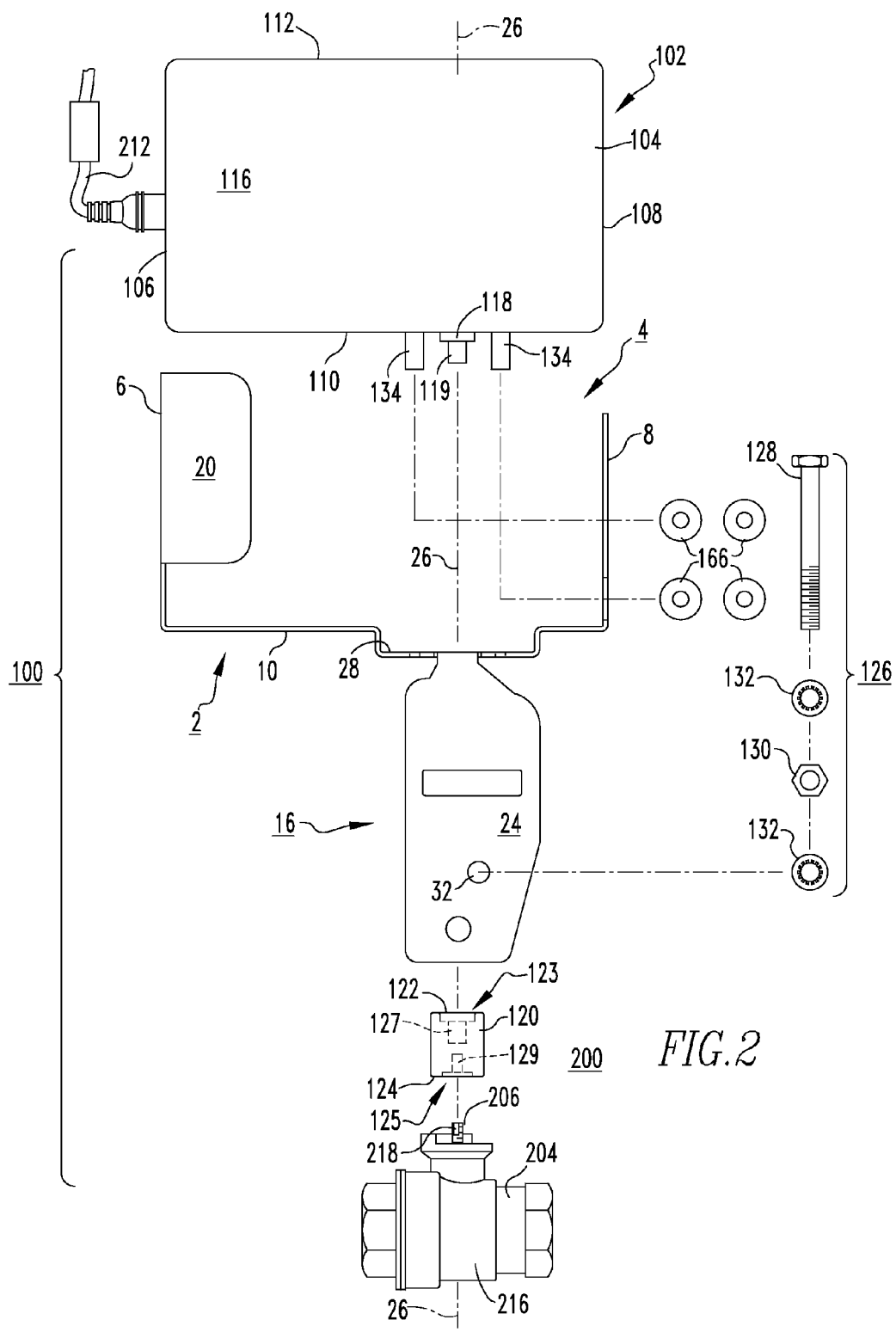
FIG. 2 is an exploded side elevation view of the opposite side of the water shutoff system, and valve actuator assembly and actuator installation bracket therefor, and ball valve of FIG. 1.

FIGS. 1 and 2 show a valve actuator assembly 100 for a fluid shutoff system 200. The valve actuator assembly 100 includes an actuator installation bracket 2 in accordance with embodiments of the invention. The shutoff system 200 example shown and described herein is a water shutoff system 200 including a waterline 202 (FIG. 1) for supplying water and a shutoff valve, such as the ball valve 204 shown. The globe valve 204 is coupled to the waterline 202 (FIG. 1) and includes a stem 206 (shown in hidden line drawing in FIG. 1).

An actuator 102 of the valve actuator assembly 100 of the water shutoff system 200 includes a housing 104 with a first end 106, second end 108, a base 110, a top 112, first and second sides 114 (FIG. 1), 116 (FIG. 2), and a pivotable actuating member 118. The pivotable actuating member 118 protrudes from the base 110 of the housing 104, and is operated (e.g., moved) by a motor 146 (shown in simplified form in FIG. 1) enclosed by the housing 104. The motor 146 is powered by a suitable power supply 210 (shown in simplified form in FIG. 1), as defined herein. In the example of FIG. 1, the power supply 210 includes a power cable 212 coupled to a power receptacle 162 (FIG. 6) on the first end 106 of the actuator housing 104. The actuator 102 also includes a transceiver 140 having, for example, a radio processor 142 and microcomputer (μC) 144, both shown in simplified form in FIG. 1. The example radio processor 142 is in wireless communication with one or more nodes, such as the base station 152, although the invention is applicable to other systems in which the radio processing 142 is in wireless communication with other nodes, such as the sensor 150. It will, however, be appreciated that any known or suitable alternative mechanism and/or communication network could be employed to actuate the actuator 102, without departing from the scope of the invention.

Accordingly, it will be appreciated that the water shutoff system 200 is automated as part of an automated awareness system. As part of such automated awareness system, the transceiver 140 of the actuator 102 is structured to receive a message from one of the nodes (e.g., sensor 150 and/or base station 152) and, to responsively pivot the pivotable actuating member 118 of the actuator 102. For example and without limitation, such message may relate to a flood condition detected by the sensor 150. In response, a message may be communicated to the transceiver 140 of the actuator 102, in order that the motor 146 of the actuator 102 of the automated water shutdown system 200 is actuated to close the ball valve 204 and thereby prohibit water from continuing to be supplied through the waterline 202. Automated awareness systems are described, for example, in United States Patent Application Publication No. 2006/0125632 (Luebke et al.) published on Jun. 15, 2006, which is hereby incorporated herein by reference.

Figure 3:
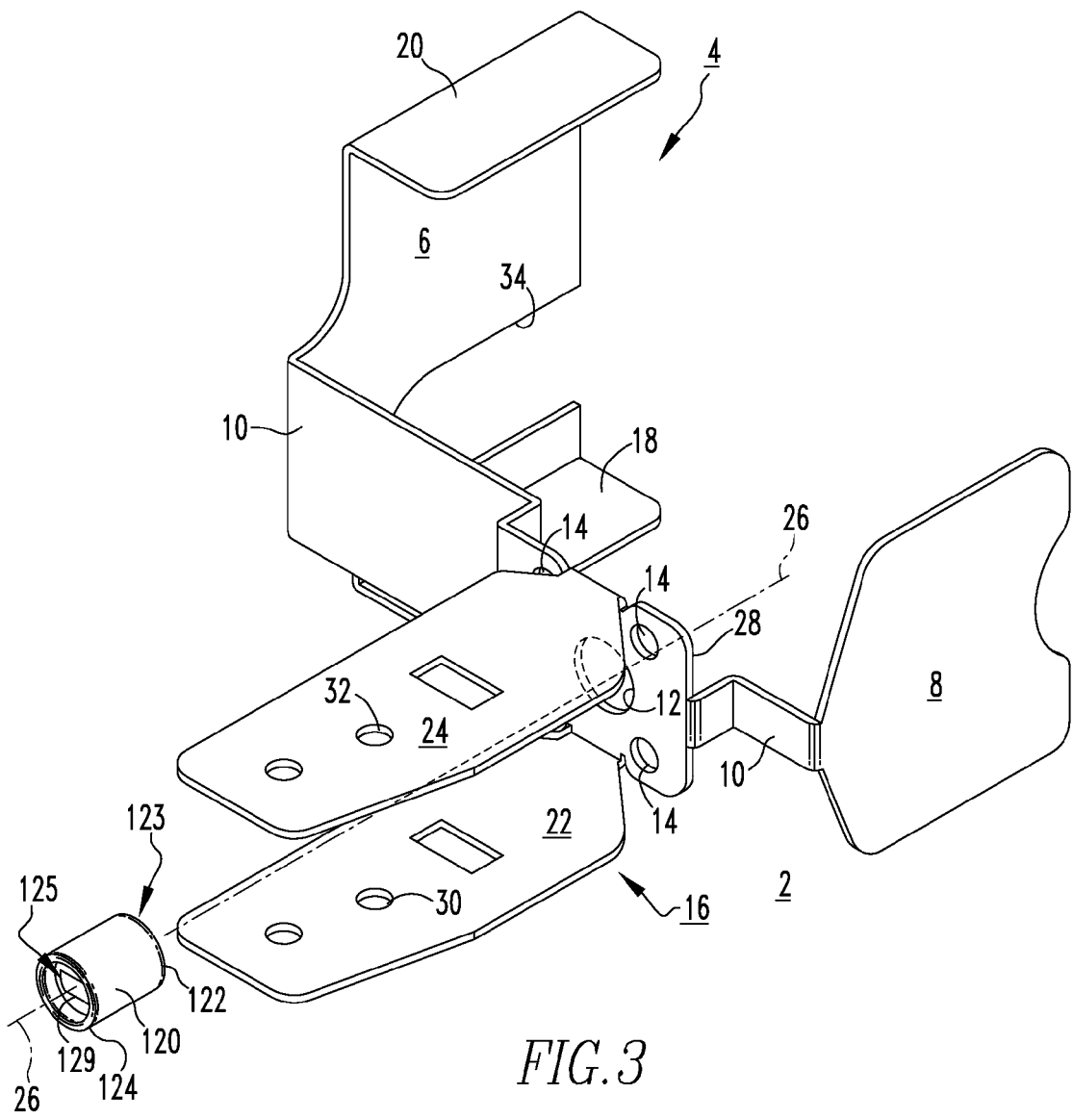
FIG. 3 is an exploded isometric view of the actuator installation bracket and valve key of the valve actuator assembly of FIG. 2.
Figure 5:
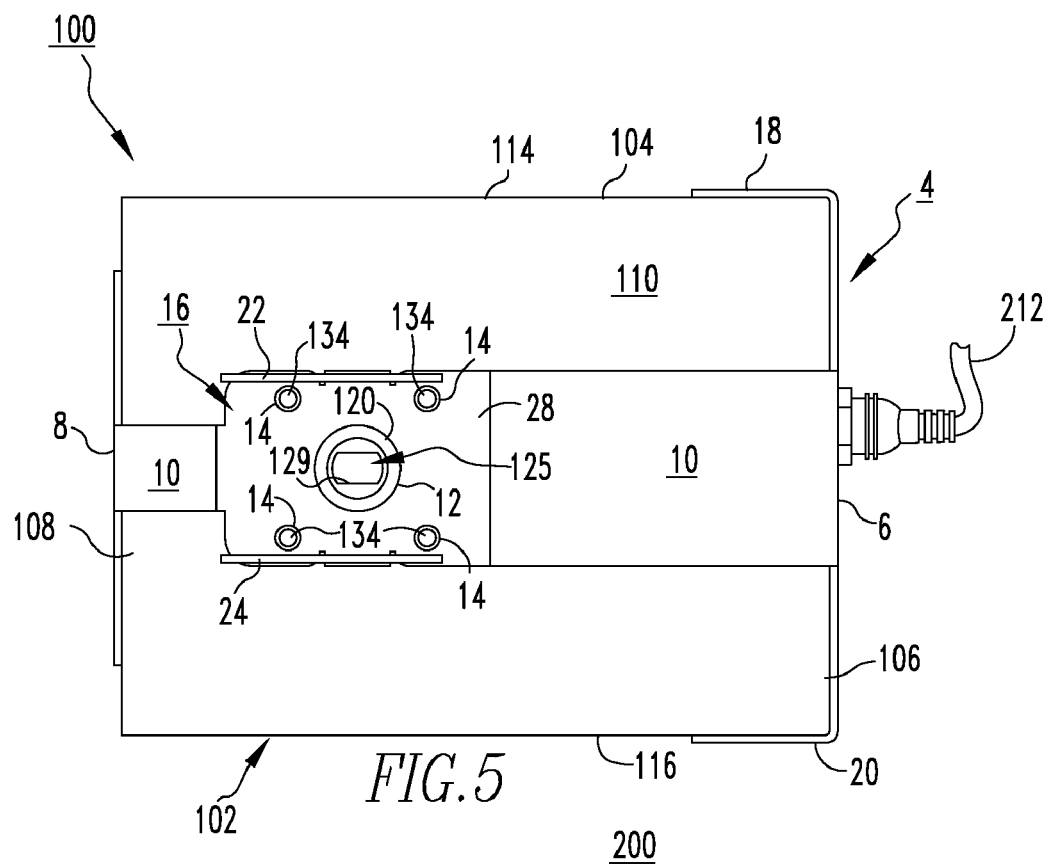
FIG. 5 is a bottom plan view of the water shutoff system, and valve actuator assembly and actuator therefor of FIG. 2, modified to show the assembly before being coupled to the ball valve.
Figure 6:
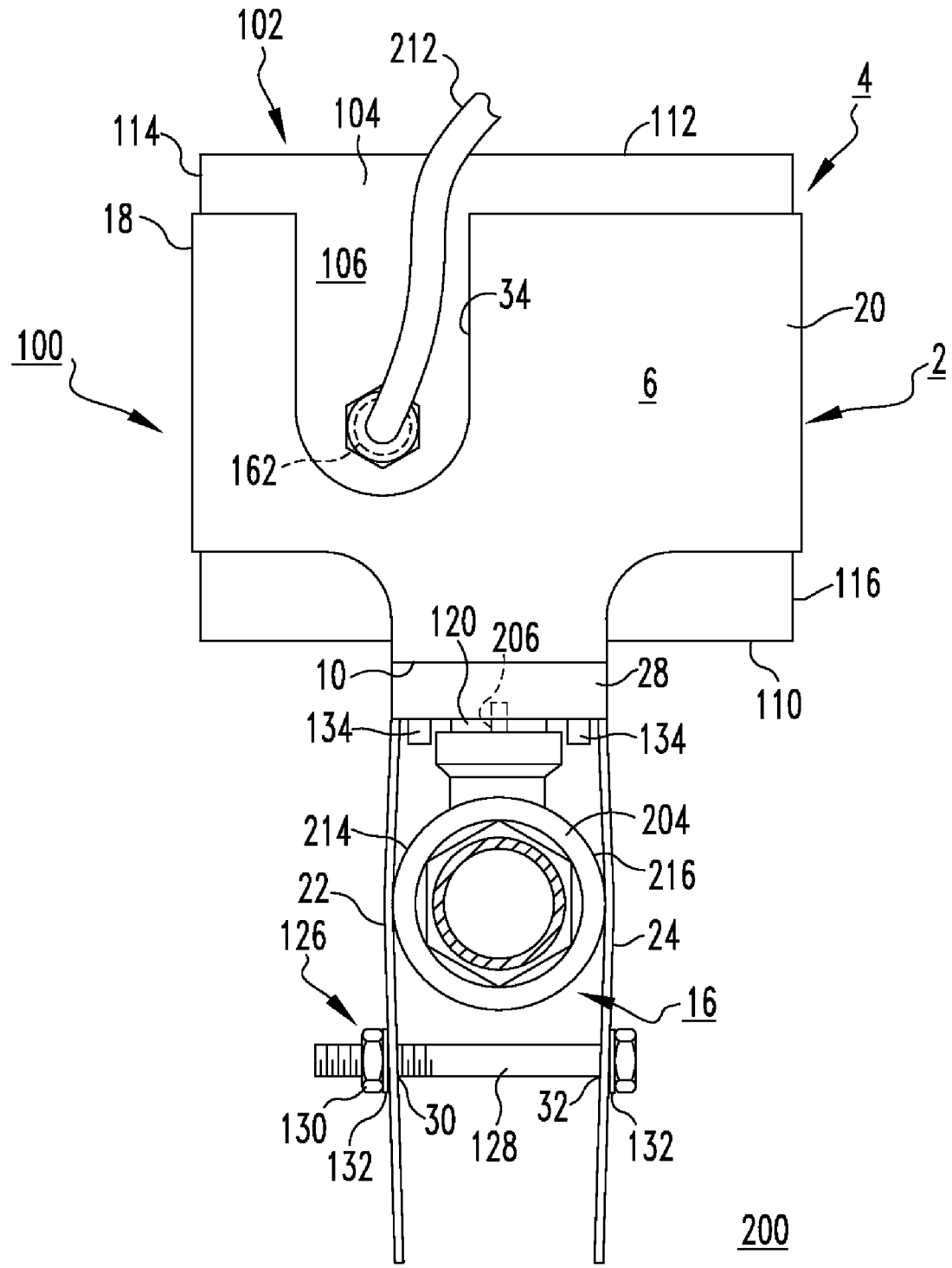
FIG. 6 is an end elevation view of the water shutoff system, and valve actuator assembly and actuator installation bracket therefor, and ball valve of FIG. 2.

Referring to FIGS. 1-3, 5 and 6, the actuator installation bracket 2, which secures the actuator 102 (not shown in FIG. 3) in the proper orientation with respect to shutoff valve 204 (not shown in FIG. 3), includes a first mounting portion 4 having first and second ends 6,8 and a base portion 10 extending therebetween. The ends 6,8 extend outwardly from the base portion 10 in order to engage the first and second ends 106,108 of the actuator housing 104, as shown in FIGS. 1 and 5. The base portion 10 receives the base 110 of the actuator housing 104, and includes a number of apertures, such as the first and second apertures 12,14, which are best shown in FIG. 3. A second mounting portion 16 extends outwardly from the base portion 10 of the first mounting portion 4, and is structured to be coupled to one of the waterline 202 (FIG. 1) and the shutoff valve 204 (FIGS. 1, 2 and 6). A fastening mechanism 126, such as the bolt 128, nut 130, and lock washer 132 combination, best shown in FIG. 2, fastens the second mounting portion 16 of the actuator installation bracket 2 to the shutoff valve 204 (best shown in FIGS. 1 and 6), in order to align the pivotable actuating member 118 (FIGS. 1 and 2) of the actuator 102 with the first aperture 12 (FIGS. 1, 3 and 5) of the base portion 10 of first mounting portion 4, and with the stem 206 (FIGS. 1 and 2) of the shutoff valve 204. A key 120 interconnects the pivotable actuating member 118 and the stem 206.

Figure 4:
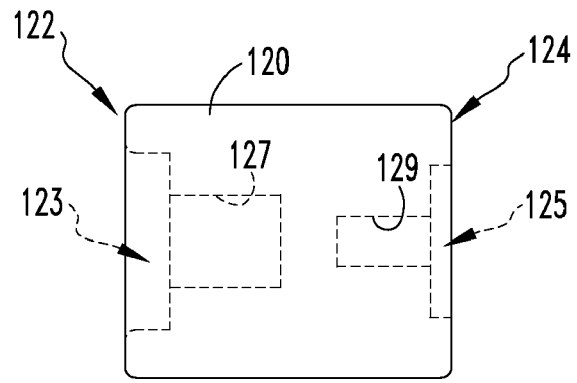
FIG. 4 is a side elevation view of the valve key of FIG. 3, showing internal features of the key in hidden line drawing.

More specifically, as best shown in FIGS. 1, 3 and 4, the key 120 includes a first end 122 having a first recess 123 (FIGS. 3 and 4) coupled to the pivotable actuating member 118 (FIGS. 1 and 4) of actuator 102 (FIGS. 1 and 4), and a second end 124 including a second recess 125 coupled to the stem 206 (FIG. 1) of the shutoff valve 204 (FIGS. 1 and 4). As shown in FIG. 2, the stem 206 of the ball valve 204 includes at least one substantially flat portion 218, and the pivotable actuating member 118 of the actuator 102 comprises a pivotable protrusion 118 also having at least one flat portion 119. The first recess 123 of the first end 122 of key 120 includes at least one flat portion 127 structured to receive and engage the corresponding flat portion 119 of the pivotable protrusion 118 of the actuator 102, and the second recess 125 of the second end of key 120 includes at least one flat portion 129 for receiving and engaging the corresponding flat portion 218 of the stem 206 of shutoff valve 204. In this manner, movement (e.g., resulting from actuation by motor 146 of FIG. 1) of the pivotable protrusion 118 of the actuator 102 is transmitted through the key 120 to the stem 206 of the valve 204, in order to operate the valve 204 between an open position (shown in FIG. 6), in which water is free to flow through the ball valve 204, and a closed position (not shown) in which water is prohibited from flowing through the valve 204.

As shown in FIG. 3, the first end 6 of the first mounting portion 4 of the actuator installation bracket 2 further includes first and second opposing ears 18,20 which extend outwardly and generally perpendicularly from the first end 6. At least one of the ears 18,20 is structured to engage at least one of the first and second sides 114 (FIG. 1), 116 (FIG. 2) of the actuator housing 104. In the example shown and described herein, the first and second ears 18,20 engage the first and second sides 114,116 (best shown in FIG. 5), respectively, of the actuator 102. The example second mounting portion comprises a generally U-shaped portion 16 including a first side flange 22 and a second side flange 24 disposed opposite and distal from the first side flange 22, as shown. The generally U-shaped portion 16 and the first and second side flanges 22,24 thereof extend outwardly from the base portion 10 of first mounting portion 4 in the opposite direction of the first and second ends 6,8 of the first mounting portion 4. The generally U-shaped portion 16 is also rotated about a vertical axis 26 (FIGS. 2 and 3) of the bracket 2, about 90 degrees with respect to the first and second ends 6,8 of the first mounting portion 4. The base portion 10 of the first mounting portion 4 further includes a recessed section 28 structured to receive the pivotable actuating member 118, which protrudes from the base 110 of the actuator housing 104, best shown in FIG. 1. The recessed section 28 of the example actuator installation bracket 2 includes the aforementioned first and second apertures 12,14. The first aperture 12 receives a portion of the key 120 therethrough, as best shown in FIG. 5. The second apertures 14 receive a plurality of protrusions 134 which extend outwardly form the base 110 of the housing 104 of actuator 102, as shown in FIGS. 1 and 5. The example actuator 102 has four such protrusions, which comprise pins 134. A number spacers 160 are structured to be received between the base 110 of the actuator housing 104 in the recessed section 28 of the base portion 10 of first mounting portion 4 of the example actuator installation bracket 2, as shown in FIGS. 1 and 2. In this manner, the actuator 102 and pivotable operating member 118 thereof can be properly spaced with respect to the key 120 and valve stem 206 coupled thereto.

FIG. 6 shows the valve actuator assembly 100 and actuator installation bracket 2 thereof coupled to the shuttoff valve 204 of the water shutoff system 200. Specifically, the example ball valve 204 includes first and second sides 214,216 which are received within the generally U-shaped portion 16 of the actuator installation bracket 2. The bolt 128 of the fastening mechanism 126 is then inserted through thru holes 30,32 in the first and second side flanges 22,24, respectively, of the U-shaped portion 16. The nut 130 is then tightened on the bolt 128 in order that the first side flange 22 and the second side flange 24 engage the first and second sides 214,216, respectively, of the ball valve 204. This secures the actuator installation bracket 2 and actuator 102 coupled thereto to the ball valve 204. A number of lock washers 132 can also be employed in order to maintain the fastened position of the valve actuator assembly 100. It will, however, be appreciate that any known or suitable alternative fastening mechanism (not shown) other than the bolt 128, nut 130 and lock washers 132 combination shown and described herein, could be employed in any suitable alternative configuration (not shown), without departing from the scope of the invention. It will also be appreciated that the actuator installation bracket 2 could alternatively be fastened to the water line 202 (FIG. 1) or any other suitable structure which is disposed proximate the ball valve 204, rather than being attached directly to the ball valve 204, as shown.

Continuing to refer to FIG. 6, it will be appreciated that the first end 6 of first mounting portion 4 of the example actuator installation bracket 2 further includes a slot 34 for providing access to the power receptacle 162 of the first end 116 of the actuator housing 104. Specifically, the power cord 212 of the power supply 210 (FIG. 1) is received through the slot 34. Accordingly, the disclosed actuator installation bracket 2 provides a relatively low cost mechanism for retrofitting existing valves (e.g., without limitation, ball valve 204) in order to provide automated operation of such valves, without requiring disassembly, for example, of the valve 204, the waterline 202, or both. Thus, a valve actuator assembly 100 is provided, which can be supplied, for example, in the form of a relatively low cost kit having a minimal number of parts, and the kit can be relatively easily installed by a layman, without requiring a skilled plumber to be hired.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An actuator installation bracket for a fluid shutoff system, said fluid shutoff system including a fluid line for supplying fluid, a shutoff valve coupled to said fluid line and including a stem, and an actuator, said actuator including a housing having a first end, a second end, a plurality of sides, and a pivotable actuating member, said pivotable actuating member protruding from one of said sides of said housing, said actuator installation bracket comprising:

a first mounting portion including first and second ends and a base portion extending therebetween, said base portion including a number of apertures and being structured to receive said one of said sides of said housing which has said pivotable actuating member protruding therefrom;

a second mounting portion extending outwardly from said base portion of said first mounting portion and being structured to be coupled to one of said fluid line and said shutoff valve, in order tat said pivotable actuating member of said actuator is aligned with a corresponding one of said apertures of said base portion of said first mounting portion and with said stem of said shutoff valve, wherein said pivotable actuating member of said actuator is structured to be coupled to said stem of said shutoff valve in order to pivot said stem and operate said shutoff valve between an open position corresponding to fluid being free to flow through said shutoff valve, and a closed position corresponding to fluid being prohibited from flowing through said shutoff valve;

wherein the first and second ends of said first mounting portion extend outwardly from said base portion and are structured to engage the first end of said housing of said actuator and the second end of said housing of said actuator) respectively; and wherein said sides of said housing of said actuator include abase, atop, and first and second sides; wherein the first end of said first and second ends of said first mounting portion further comprises first and second opposing ears extending outwardly generally perpendicularly from the first end; and wherein said first and second opposing ears are structured to engage said first and second sides of said housing of said actuator, respectively.

2. A valve actuator assembly for a fluid shutoff system including a fluid line for supplying fluid and a shutoff valve coupled to said fluid line, said shutoff valve including a stem, said valve actuator assembly comprising:

an actuator including a housing having a first end, a second end, a base, atop, first and second sides, and a pivotable actuating member, said pivotable actuating member protruding from said base of said housing;

a key including a first end coupled to said pivotable actuating member of said actuator, and a second end structured to be coupled to said stem of said shutoff valve;

an actuator installation bracket comprising:

a first mounting portion including a base portion and first and second ends extending outwardly from said base portion in order to engage the first end of said housing of said actuator and the second end of said housing of said actuator, respectively, said base portion receiving said base of said housing of said actuator, said base portion including a number of apertures, a second mounting portion extending outwardly from said base portion of said first mounting portion and being structured to be coupled to one of said fluid line and said shutoff valve; and a fastening mechanism fastening said second mounting portion of said actuator installation bracket to said one of said fluid line and said shutoff valve, in order to align said pivotable actuating member of said actuator with a corresponding one of said apertures of said base portion of said first mounting portion and said stem of said shutoff valve, and said key, wherein said actuator is structured to pivot said stem of said shutoff valve, thereby operating said shutoff valve between an open position corresponding to fluid being free to flow through said shutoff valve, and a closed position corresponding to fluid being prohibited from flowing through said shutoff valve; and wherein the first end of said first mounting portion further comprises first and second opposing ears extending outwardly generally perpendicularly from the first end; and wherein said first and second opposing ears engage said first and second sides, respectively, of said housing of said actuator.

3. A valve actuator assembly for a fluid shutoff system including a fluid line for supplying fluid and a shutoff valve coupled to said fluid line, said shutoff valve including a stem, said valve actuator assembly comprising:

an actuator including a housing having a first end, a second end, a base, a top, first and second sides, and a pivotable actuating member, said pivotable actuating member protruding from said base of said housing;

a key including a first end coupled to said pivotable actuating member of said actuator, and a second end structured to be coupled to said stem of said shutoff valve;

an actuator installation bracket comprising:

a first mounting portion including a base portion and first and second ends extending outwardly from said base portion in order to engage the first end of said housing of said actuator and the second end of said housing of said actuator, respectively, said base portion receiving said base of said housing of said actuator, said base portion including a number of apertures, a second mounting portion extending outwardly from said base portion of said first mounting portion and being structured to be coupled to one of said fluid line and said shutoff valve; and a fastening mechanism fastening said second mounting portion of said actuator installation bracket to said one of said fluid line and said shutoff valve, in order to align said pivotable actuating member of said actuator with a corresponding one of said apertures of said base portion of said first mounting portion and said stem of said shutoff valve, and said key, wherein said actuator is structured to pivot said stem of said shutoff valve, thereby operating said shutoff valve between an open position corresponding to fluid being free to flow through said shutoff valve, and a closed position corresponding to fluid being prohibited from flowing through said shutoff valve; and wherein said base of said housing of said actuator comprises a plurality of protrusions extending outwardly therefrom; wherein said base portion of said first mounting portion further comprises a recessed section structured to receive said pivotable actuating member protruding from said base of said housing of said actuator; wherein said apertures of said base portion of said first mounting portion are disposed in said recessed section thereof; and wherein said recessed section of said base portion of said first mounting portion includes as said number of apertures, a first aperture for receiving said key and a plurality of second apertures for receiving said protrusions extending outwardly from said base of said actuator housing.

4. A fluid shutoff system comprising:

a fluid line for supplying fluid;

a shutoff valve coupled to said fluid line, said shutoff valve including a stem;

a valve actuator assembly comprising:

an actuator including a transceiver, a housing, and a pivotable actuating member, said housing enclosing said transceiver and including a first end, a second end, a base, a top, and first and second sides, said pivotable actuating member protruding from said base of said housing, a key including a first end coupled to said pivotable actuating member of said actuator, and a second end coupled to said stem of said shutoff valve;

an actuator installation bracket comprising:

a first mounting portion including a base portion and first and second ends extending outwardly from said base portion in order to engage the first end of said housing of said actuator and she second end of said housing of said actuator, respectively, said base portion receiving said base of said housing of said actuator, said base portion including a number of apertures, a second mounting portion extending outwardly from said base portion of said first mounting portion and being coupled to one of said fluid line and said shutoff valve, a fastening mechanism securing said second mounting portion of said actuator installation bracket to said one of said fluid line and said shutoff valve, in order to align said pivotable actuating member of said actuator with a corresponding one of said apertures of said base portion of said first mounting portion and said stem of said shutoff valve, and said key coupled between said pivotable actuating member and said stem, a number of nodes in electrical communication with said transceiver of said actuator;

a power supply providing electrical power to said actuator, wherein said actuator is coupled to said stem of said shutoff valve by said key, in order to move said stern and operate said shutoff valve between an open position corresponding to fluid being free to flow through said shutoff valve, and a closed position corresponding to fluid being prohibited from flowing through said shutoff valve, wherein said transceiver of said actuator is structured to receive a message from one of said nodes and responsively pivot said pivotable actuating member of said actuator; and wherein the first end of said first mounting portion further comprises first and second opposing ears extending outwardly generally perpendicularly from the first end of said first mounting portion; and wherein said first and second opposing ears engage said first and second sides, respectively, of said housing of said actuator.

5. A fluid shutoff system comprising:

a fluid line for supplying fluid;

a shutoff valve coupled to said fluid line, said shutoff valve including a stem;

a valve actuator assembly comprising:

an actuator including a transceiver, a housing, and a pivotable actuating member, said housing enclosing said transceiver and including a first end, a second end, a base, a top, and first and second sides, said pivotable actuating member protruding from said base of said housing;

a key including a first end coupled to said pivotable actuating member of said actuator, and a second end coupled to said stem of said shutoff valve;

an actuator installation bracket comprising:

a first mounting portion including a base portion and first and second ends extending outwardly from said base portion in order to engage the first end of said housing of said actuator and the second end of said housing of said actuator, respectively, said base portion receiving said base of said housing of said actuator, said base portion including a number of apertures, a second mounting portion extending outwardly from said base portion of said first mounting portion and being coupled to one of said fluid line and said shutoff valve, a fastening mechanism securing said second mounting portion of said actuator installation bracket to said one of said fluid line and said shutoff valve, in order to align said pivotable actuating member of said actuator with a corresponding one of said apertures of said base portion of said first mounting portion and said stem of said shutoff valve, and said key coupled between said pivotable actuating member and said stem, a number of nodes in electrical communication with said transceiver of said actuator;

a power supply providing electrical power to said actuator, wherein said actuator is coupled to said stem of said shutoff valve by said key, in order to move said stein and operate said shutoff valve between an open position corresponding to fluid being free to flow through said shutoff valve, and a closed position corresponding to fluid being prohibited from flowing through said shutoff valve, wherein said transceiver of said actuator is structured to receive a message from one of said nodes and responsively pivot said pivotable actuating member of said actuator; and wherein said base of said housing of said actuator includes a plurality of protrusions extending outwardly therefrom; wherein said base portion of said first mounting portion further comprises a recessed section for receiving said pivotable actuating member protruding from said base of said housing of said actuator; wherein said apertures of said base portion of said first mounting portion are disposed in said recessed section thereof; and wherein said recessed section of said base portion of said actuator installation bracket first mounting portion includes as said number of apertures, a first aperture receiving said key and a plurality of second apertures receiving said protrusions extending outwardly from said base of said actuator housing.

6. The fluid shutoff system of claim 5 wherein said plurality of protrusions extending outwardly from said base of said housing of said actuator comprise a plurality of pins; wherein said pins are received through said second apertures of said recess portion of said base portion of said first mounting portion; wherein said valve actuator assembly further comprises a number of spacers; and wherein said spacers are received between said base of said housing of said actuator and said recessed section of said base portion of said first mounting portion, in order to accurately space said pivotable actuating member of said actuator and said key coupled thereto with respect to said stem of said shutoff valve.

* * * * *